(12) United States Patent
Switzer

(10) Patent No.: US 7,866,641 B1
(45) Date of Patent: Jan. 11, 2011

(54) MACHINING CENTER ADAPTOR HAVING A FLUID-EMITTING ORIFICE ARRANGEMENT FOR CLEANING WORK PIECE CHUCKS

(75) Inventor: Jeff Switzer, Bellefontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 251 days.

(21) Appl. No.: 12/058,057

(22) Filed: Mar. 28, 2008

(51) Int. Cl.
*B23Q 3/02* (2006.01)
(52) U.S. Cl. .......................... 269/20; 269/309; 269/310
(58) Field of Classification Search .................. 269/20, 269/21, 900, 32, 24–27, 309–310; 279/4.12, 279/4.02; 29/281.1, 252
See application file for complete search history.

(56) References Cited

U.S. PATENT DOCUMENTS

| | | | |
|---|---|---|---|
| 1,864,307 A | 6/1932 | Johnson | |
| 3,083,025 A * | 3/1963 | Herbkersman | 279/122 |
| 3,094,023 A | 6/1963 | Lamusga | |
| 3,211,463 A | 10/1965 | Nikitas | |
| 4,322,992 A | 4/1982 | Remillard et al. | |
| 4,534,803 A | 8/1985 | Asano et al. | |
| 4,611,814 A | 9/1986 | Hiestand | |
| 5,351,376 A * | 10/1994 | Kitamura | 29/27 C |
| 6,059,702 A | 5/2000 | Winkler et al. | |
| 6,299,179 B1 * | 10/2001 | Sheffer | 279/4.12 |
| 6,539,827 B2 | 4/2003 | Yamaji et al. | |
| 6,764,386 B2 * | 7/2004 | Uziel | 451/39 |
| 6,886,227 B1 * | 5/2005 | Hedrick | 29/252 |
| 7,144,207 B2 | 12/2006 | Weigel | |
| 2008/0157487 A1 * | 7/2008 | Hall et al. | 279/4.12 |

* cited by examiner

*Primary Examiner*—Lee D Wilson
(74) *Attorney, Agent, or Firm*—Standley Law Group LLP

(57) ABSTRACT

An adaptor and its method of use for cleaning the work piece chuck clamping surfaces of a turning center (lathe). An adaptor of the present invention includes a number of orifices that are arranged and oriented to direct pressurized fluid (e.g., air and/or another fluid) against the clamping surfaces of the work pieces chucks when a work piece is not present. The pressurized fluid impinges on the work piece chuck clamping surfaces, thereby removing chips and/or other debris therefrom.

18 Claims, 4 Drawing Sheets

(SECTION 3-3)

MACHINING CENTER ADAPTOR HAVING A FLUID-EMITTING ORIFICE ARRANGEMENT FOR CLEANING WORK PIECE CHUCKS

BACKGROUND OF THE INVENTIVE FIELD

The present invention is directed to an adaptor for attachment to a rotating work piece holder of a machining center. More particularly, the present invention is directed to an adaptor that is designed to clean the clamping surfaces of a number of associated work piece chucks using a pressurized fluid, such as pressurized air, water or coolant.

Computerized (i.e., CNC) machining centers are well known in the machining industry. Variations of such devices include, for example, vertical machining centers, horizontal machining centers and turning centers. CNC turning centers are essentially high-tech lathes that are operative to turn various components. Typically, turning operations in such turning centers follow preprogrammed numerical instructions, thereby requiring little if any operator intervention. CNC turning centers may further automate the turning process by providing for automatic part loading and unloading, etc. Lathes are, of course, also well known in the industry, and are generally turning centers absent computer control.

CNC turning centers and other lathes typically include a work piece holder that is attached to a rotating spindle. A work piece is securely affixed to the work piece holder during the turning operation. Various techniques may be employed to secure a work piece to a work piece holder. A common technique, and the technique of interest herein, includes the use of a number of moveable chucks that are associated with the work piece holder. Such chucks are typically moveable in a direction transverse to the longitudinal axis of the spindle. In this manner, a number of such chucks can be located about the periphery of a work piece and used to exert an inward clamping force on the work piece—thereby securing the work piece to the work piece holder during a turning operation.

During a turning operation, considerable heat can be generated between the work piece and the cutting tool(s) used to shape the work piece. Consequently, coolant is typically applied to a work piece and/or cutting tool during the cutting operation. When turning is performed on an exterior portion of the work piece, the application of coolant is commonly accomplished via one or more nozzles that are typically repositionable as needed. In the case of turning along an interior bore, however, access thereto by such nozzles is not always possible. As such, an adaptor may be affixed to the end of the work piece holder (or to a part locator mountable to the work piece holder) to apply coolant to an interior portion of the work piece as needed. Excess coolant typically flows off of, and/or out of, the work piece and into a collection device during a turning operation.

As would be apparent to one skilled in the art, numerous shavings and chips (collectively referred to hereinafter as "chips") of work piece material are generated during a typical turning operation. These chips typically collect on various parts of the turning center, including the chucks or other mechanisms employed to retain the work piece on the work piece holder. When a work piece has a bore or other interior void(s), chips may collect therein as well. Consequently, turning centers commonly employ various cleaning functions to remove such chips. For example, a turning center may utilize one or more of a coolant flush, air blow and/or high-speed rotation operation in order to effectuate chip removal.

It has been found, however, that even after using one or more of such cleaning techniques, chips sometimes remain on the chucks of a work piece holder. The chips are believed to remain for several reasons. First, during a high-speed spinning operation, generated centrifugal forces actually press the chips against the clamping surfaces of the chucks, thereby making ejection thereof difficult. Dried or partially dried coolant may also tend to adhere chips to the clamping surfaces of the work piece chucks. Further, current adaptors for emitting pressurized fluid fail to actually direct a flow of fluid at the chuck surfaces. As such, chips may remain on the clamping surfaces of work piece chucks, even after a cleaning operation has been completed.

The presence of such chips can interfere with the clamping of a new work piece to the work piece holder and may also interfere with a subsequent turning operation or other machine functions if dislodged. Further, clamping a work piece when chips are present on one or more of the work piece chuck clamping surfaces can result in the work piece being out of position. Consequently, subsequent machining operations may produce a work piece that is dimensionally inaccurate (e.g., that may not meet runout tolerances, etc.).

Therefore, what is needed is a device and method that can provide for a more thorough and precise cleaning of work piece holder elements—particularly, work piece chucks. An adaptor of the present invention and its method of use satisfies these needs.

SUMMARY OF THE GENERAL INVENTIVE CONCEPT

The present invention is directed to a specialized chip cleaning adaptor that can be attached to a rotating work piece holder of a CNC turning center or other lathe device (collectively referred to hereinafter as a "lathe"). An adaptor of the present invention is designed to direct a flow of pressurized fluid, such as pressurized air, at the chucks of a work piece holder for the purpose of dislodging any chips therefrom. Pressurized fluid may also be emitted to dislodge chips from the interior of a work piece. An adaptor of the present invention may also be designed to direct coolant at a cutting tool during turning of an interior bore or similar feature.

An adaptor of the present invention includes a number of fluid emitting orifices that are connected to a supply of pressurized fluid (e.g., air, coolant, etc.). The orifices are preferably located about the exterior of the adaptor so as to be alignable with the chucks of a work piece holder when a cleaning operation is required. During a cleaning operation, air and/or coolant may be emitted from the orifices to impinge on the chucks and dislodge chips that are present thereon.

In the case of a work piece requiring the turning of an internal bore or similar feature, an adaptor of the present invention is preferably also capable of supplying coolant to an associated cutting tool. As such, the orifices of an adaptor of the present invention may be located on the body of the adaptor such that they are not blocked by a portion of the work piece.

Use of an adaptor of the present invention has been found during testing to result in an improved cleaning of the clamping surfaces of work piece chucks. The design of an adaptor of the present invention has also been found during testing to substantially prevent chips from migrating behind a work piece during the turning of an interior bore or similar feature of a work piece.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
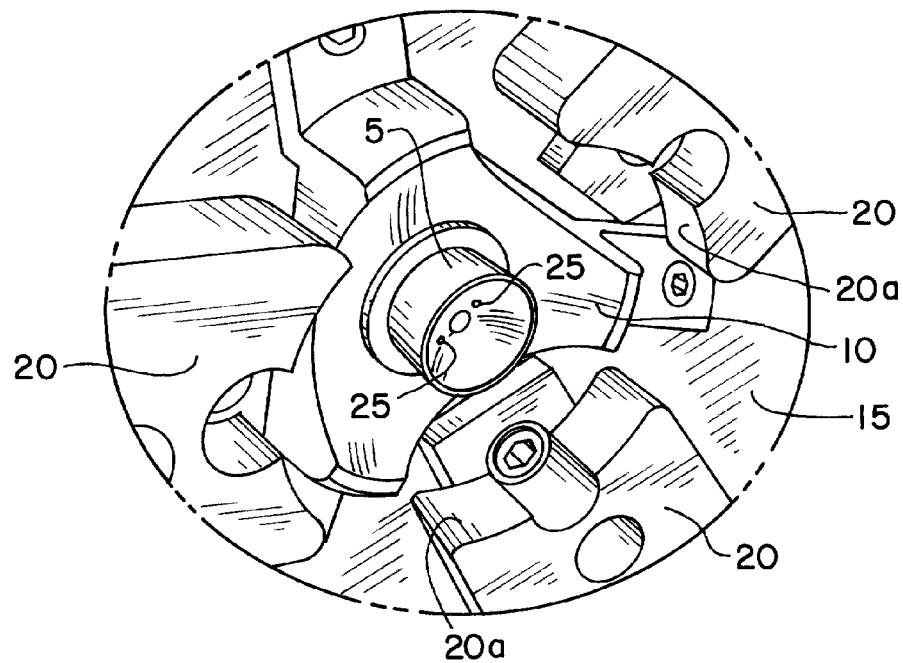
FIG. 1 shows a known adaptor mounted to a locator of a lathe.

An adaptor 5 of known design is shown installed to a work piece locator 10 in FIG. 1 of a lathe. The work piece locator 10 is, in turn, attached to the face of a work piece holder 15, which includes several work piece chucks 20. As would be understood by one of skill in the art, the adaptor 5 may be received within a bore of a work piece when a work piece having a bore is installed to the work piece locator 10 and clamped in place by the work piece chucks 20. Typically, such a work piece is installed to the locator 10 in a rough condition and is subsequently machined to proper size and shape using the lathe. A locator may be absent from some lathes. When no locator is present, the work piece chucks generally act as a work piece locator. An adaptor of the present invention may still be used with such a lathe.

As would also be understood by one of skill in the art, machining of a wall formed by a bore in the work piece must often be done with limited access thereto. Nonetheless, coolant must still generally be applied to the cutting tool used. The adaptor 5 is provided with coolant-emitting orifices 25 for this purpose. Specifically, the orifices 25 direct coolant into the bore in the work piece and onto a cutting tool. The same orifices 25 may also be used to supply a flow of pressurized fluid for expelling excess coolant and/or material chips from the interior of a work piece.

Unfortunately, the design of known adaptors, such as this adaptor 5, does not provide for adequate cleaning of the clamping surfaces 20a of the work piece chucks 20 during a cleaning operation. Specifically, and as can be clearly observed in FIG. 1, the orifices 25 of the adaptor 5 are located and oriented such that any coolant and/or air emitted therefrom is directed substantially straight forward of the adaptor. It is not possible to direct coolant and/or air at the work piece chucks 20 with such an adaptor design, even when no work piece is present. As a result, it has been found that material chips and/or coolant often remains on the clamping surfaces 20a of the work piece chucks 20 even after a cleaning operation has been performed.

As the presence of chips, coolant and/or other contaminants on the clamping surfaces of the work piece chucks can adversely affect a subsequent machining process, it is desirable to ensure that such contaminants are expelled therefrom during the cleaning process. An adaptor of the present invention can be used to ensure that such contaminants are removed. One exemplary embodiment of an adaptor of the present invention and its use with the lathe of FIG. 1 is illustrated in FIGS. 2-7 and described in more detail below.

An exemplary embodiment of a machining center chip removal adaptor (hereinafter "adaptor") 30 of the present invention can be clearly observed in FIGS. 2-3. As shown, this particular adaptor 30 includes a body having a base portion 35 of substantially circular cross-section, an optional work piece locating portion 40 that extends from the base portion, and an orifice containing portion 45 that extends from the work piece locating portion and is of substantially frusto-conical shape. Other embodiments may be of dissimilar shape to the adaptor 30 shown in FIGS. 2-3, as the shape of an adaptor of the present invention will generally be dictated at least in part by the work piece(s) with which the adaptor will be used and the manner in which it is attached to a work piece holder of an associated machining center. It should be noted that the substantially frusto-conical shape of the orifice containing portion 45 has been found to facilitate location of a work piece over the adaptor 30. However, the use of a frusto-conical shape is not required by the present invention.

Figure 3:
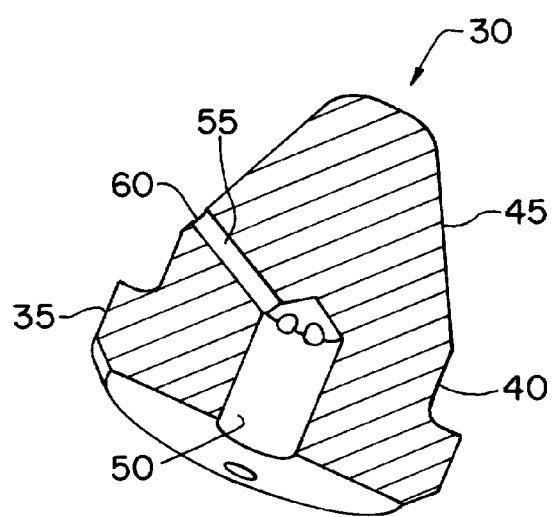
FIG. 3 is a cross-sectional view taken along line 3-3 of FIG. 2.
Figure 4:
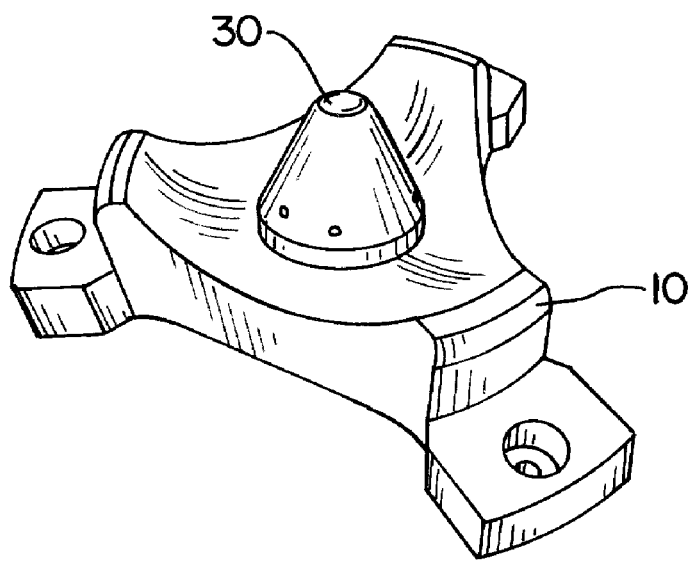
FIG. 4 shows the adaptor of FIGS. 2-3 mounted to a locator prior to installation to a lathe.
Figure 5:
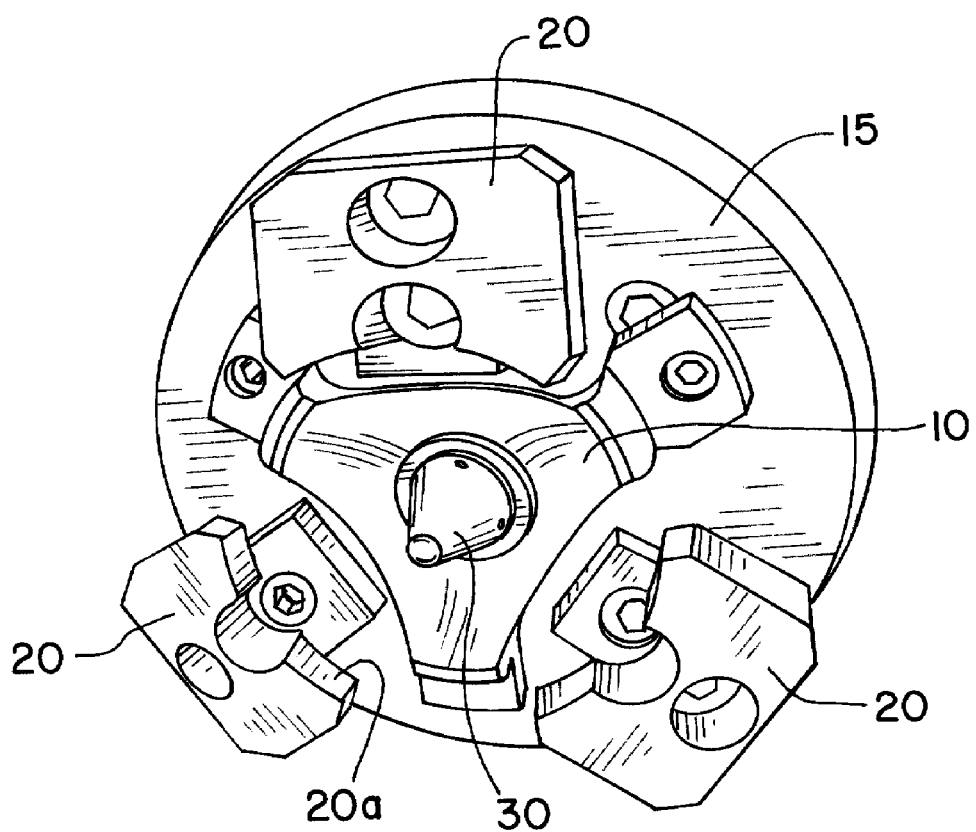
FIG. 5 depicts the locator-mounted adaptor of FIGS. 2-3 installed to a work piece holder of a lathe.

In this particular embodiment of the adaptor 30, the base portion 35 is of a size and shape dictated by a receptacle in the locator 10 that is used to retain the adaptor (see FIG. 4). As can be best observed in FIG. 3, the adaptor 30 includes a primary fluid channel 50 and a number of secondary fluid channels 55 through which a fluid such as coolant and/or pressurized air may be passed once the adaptor is properly attached to an associated work piece holder (e.g., via a known technique of passing fluids trough the spindle). The secondary fluid channels 55 exit the adaptor 30 as fluid-emitting orifices 60 in the orifice containing portion 45 thereof. In an alternate embodiment, the primary fluid channel 50 may be eliminated and the secondary fluid channels 55 may individually communicate with a supply of pressurized fluid.

As shown in FIG. 3, the secondary fluid channels 55 are angled away from the base portion 35 of the adaptor 30 so as to direct fluid from the primary fluid channel 50 both forward and outward of the adaptor 30. As described in more detail below, this orientation allows the adaptor 30 can provide coolant to a cutting tool as needed during work piece machining operations, while also allowing fluid (e.g., air) to be directed from the fluid emitting orifices 60 at the clamping surfaces 20a of the work piece chucks 20 during a cleaning operation.

The number of fluid-emitting orifices 60 and associated fluid channels 55 may vary between embodiments. In this particular embodiment, a pair of fluid-emitting orifices 60 and associated secondary fluid channels 55 is provided for each work piece chuck 20 present on the work piece holder 15. Therefore, it can be understood that such fluid-emitting orifices 60 may also be provided in groups. Further, while not specifically shown herein, it is also possible to locate a nozzle in a fluid-emitting orifice 60 of an adaptor of the present invention so as to better control the flow of fluid emitted therefrom. For example, the use of a nozzle may allow for the shaping and/or concentration of a fluid stream emitted by an orifice 60.

Figure 2:
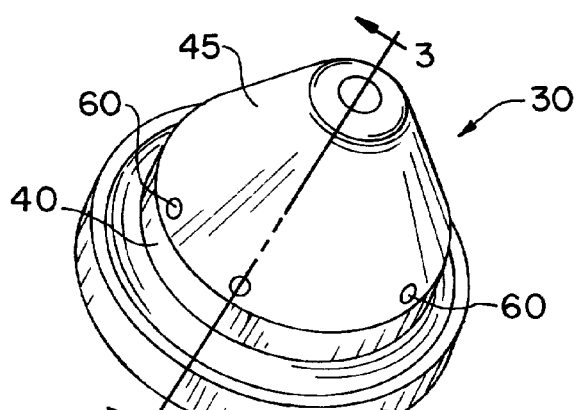
FIG. 2 illustrates one exemplary embodiment of an adaptor of the present invention.
Figure 6A:
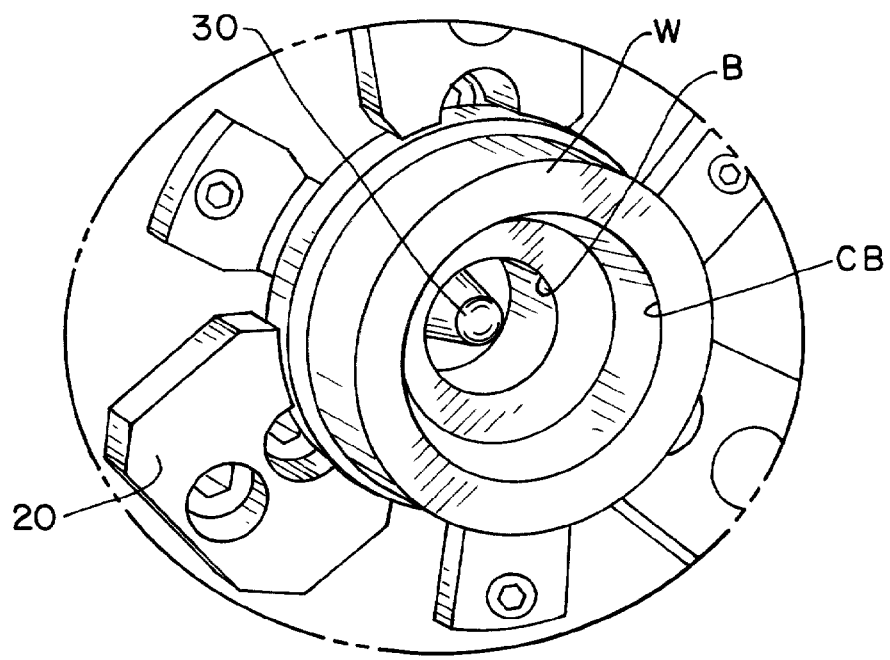
FIG. 6a illustrates a rough work piece installed to the work piece holder and over the adaptor of FIG. 5.

The adaptor 30 of FIGS. 2-3 is shown installed to the locator 10 in FIG. 4. As can be most clearly seen in FIGS. 5 and 7, the locator 10 is, in turn, installed to the face of the work piece holder 15. With the adaptor 30 and locator 10 properly installed to the work piece holder 15, a work piece W can be clamped for machining using the work piece chucks 20. As shown in FIG. 6a, a work piece W is typically clamped to the work piece holder 15 in an initially rough state—such as may be produced by a casting or forging process. The work piece W is then subjected to a machining (turning) process to produce a finished component, as depicted in FIG. 6b.

Figure 6B:
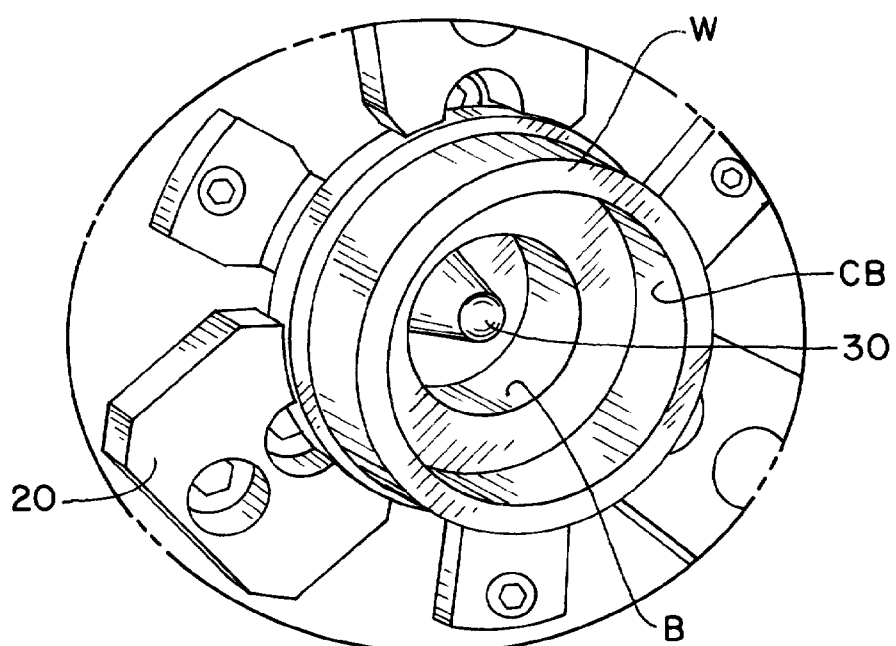
FIG. 6b shows the work piece of FIG. 6a after completion of a turning operation thereon.

As can also be observed in FIGS. 6a-6b, this particular work piece W includes a bore B into which the adaptor 30 fits when clamped for machining. Providing a work piece locating portion 40 on the adaptor 30 may help to center the work piece W on the work piece holder 15. The particular work piece W shown in FIGS. 6a-6b also includes a counter-bore CB, which may or may not exist in other work pieces.

Figure 7:
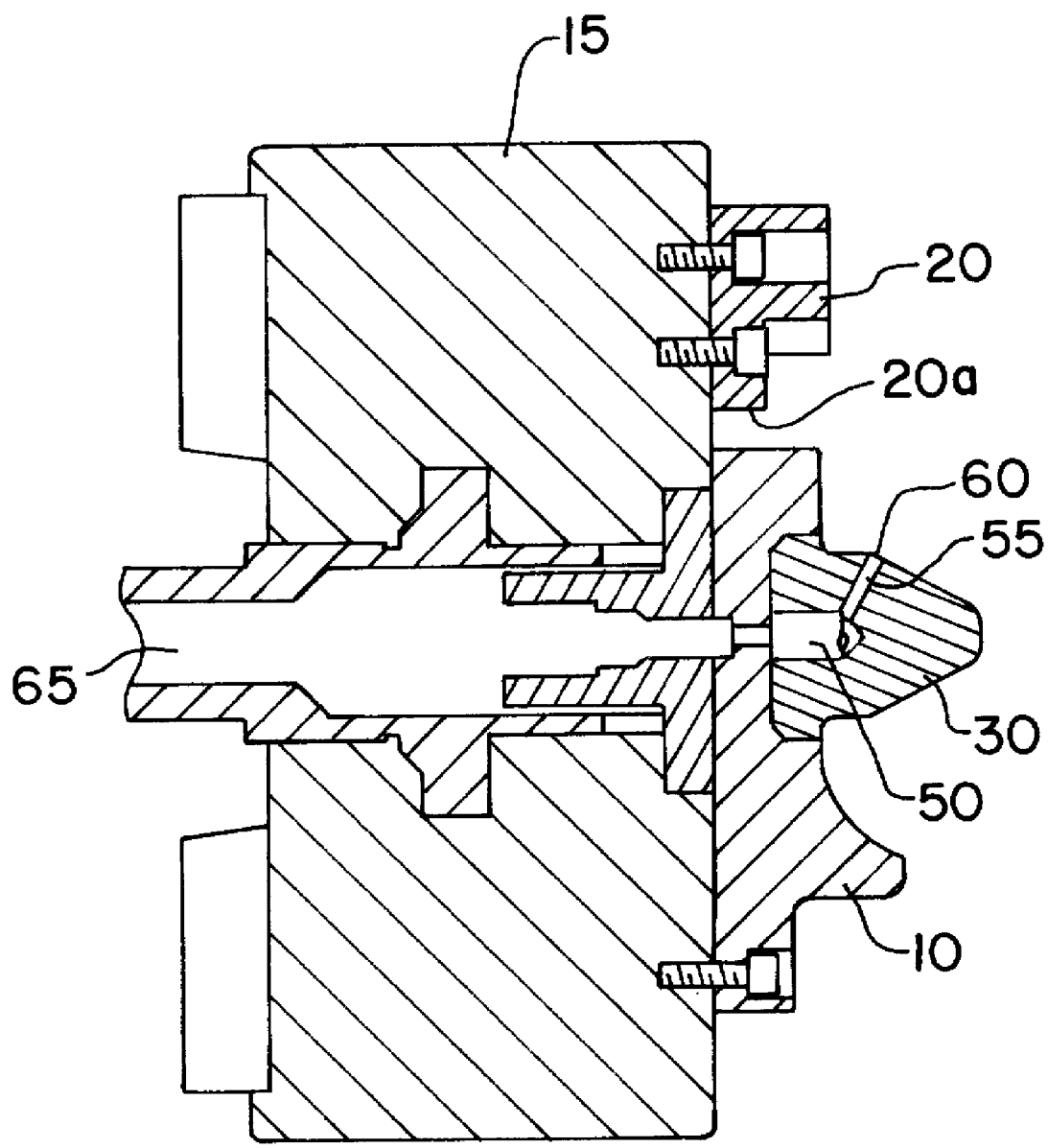
FIG. 7 is a side view, in partial transparency, of the arrangement shown in FIGS. 6a-6b, with the adaptor depicted in cross-section.

As can be understood by reference to FIGS. 6a-6b, machining within the bore B and/or counter-bore CB of such a work piece W will require a flow of coolant to the cutting tool(s) used. This flow of coolant frequently must be supplied through an adaptor, as access to the bore B and counter-bore CB from the exterior of the work piece W may be quite limited. In order to provide such a supply of coolant in this particular embodiment, it can be observed in FIGS. 6a-6b and FIG. 7 that the fluid-emitting orifices 60 of the adaptor 30 exit the orifice containing portion 45 thereof within the bore B of the work piece W. That is, the fluid-emitting orifices 60 are not covered or otherwise blocked by the work piece W when the work piece is clamped in a machining position. As such, and as best illustrated in FIG. 7, a supply of coolant may pass from a source, through the primary fluid channel 50 and secondary fluid channels 55, and be emitted from the fluid-emitting orifices 60 into the bore B of the work piece W. If such a coolant supply is not required, ensuring that the fluid emitting orifices are not blocked by a work piece is unnecessary.

Once machining of the work piece W is complete, the work piece chucks 20 are released and the work piece is removed from the work piece holder 15. A cleaning operation may then be performed prior to the location and clamping of a new work piece to the work piece holder 15. A typical cleaning operation using a known adaptor may include flooding the clamping area with coolant and/or a coolant/air mixture, and subsequently spinning the spindle 65 and attached work piece holder 15 of the lathe in an attempt to dislodge any material chips and/or other contaminants from the clamping surfaces 20a of the work piece chucks 20.

A cleaning operation that utilizes an adaptor of the present invention may continue to employ the coolant flooding and/or spinning aspect of a known cleaning operation or, alternatively, such steps may be eliminated. In either case, when cleaning of the work piece chuck clamping surfaces 20a is required, a flow of pressurized air is emitted from the fluid-emitting orifices 60 so as to impinge on the work piece chuck clamping surfaces 20a. Pressurized air may be supplied to the fluid-emitting orifices 60 in the same manner as is described above with respect to the emission of coolant therefrom. In other embodiments, it may be possible to use coolant instead of, or in combination with pressurized air, to clean the work piece chuck clamping surfaces.

It has been found that a pressurized airflow from the fluid-emitting orifices of an adaptor of the present invention is usually, alone, sufficient to dislodge any chips that may reside on the work piece chuck clamping surfaces. However, nothing herein precludes work piece chuck cleaning via the use of pressurized air from an adaptor in conjunction with a flood of coolant and/or rotation of the work piece holder.

Different adaptors may be constructed for use in machining different work pieces. Such adaptors may be designed for installation to a locator that is already mounted to a work piece holder. Other adaptors may be designed to remain with a locator, such that a locator/adaptor assembly is installed to the work piece holder. As mentioned above, adaptors of the present invention may be of various size and/or shape as needed to comply with various work pieces and or lathes with which they may be used. Adaptors of the present invention may be designed to extend into a bore in a work piece. Other adaptors of the present invention may reside behind a clamped work piece. Therefore, it can be understood that while certain embodiments of the present invention are described in detail above, the scope of the invention is not to be considered limited by such disclosure, and modifications are possible without departing from the spirit of the invention as evidenced by the following claims:

What is claimed is:

1. A chip removal adaptor for use on a lathe having a rotating work piece holder and a number of work piece chucks for releasably securing a work piece to the work piece holder, comprising:
  an adaptor body having a base portion designed for direct or indirect attachment to said work piece holder and a substantially frusto-conically shaped orifice-containing portion having at least one fluid emitting orifice; and
  a fluid channel for connecting each fluid emitting orifice to a source of pressurized fluid;
  wherein said at least one fluid emitting orifice exits said adaptor body at an angle that will direct fluid emitted therefrom at clamping surfaces of said work piece chucks.

2. The adaptor of claim 1, further comprising a locator for retaining said base portion of said adaptor body and securing said adaptor body to said work piece holder.

3. The adaptor of claim 1, further comprising a primary fluid channel connecting each orifice fluid channel to a source of pressurized fluid.

4. The adaptor of claim 1, wherein said fluid emitting orifices exit said orifice-containing portion of said adaptor body at a location that permits the introduction therethrough of coolant into a bore of an associated work piece while said work piece is maintained in a machining position on said lathe.

5. The adaptor of claim 1, wherein said pressurized fluid is air.

6. The adaptor of claim 1, wherein said pressurized fluid is coolant.

7. The adaptor of claim 1, wherein said pressurized fluid includes both air and coolant.

8. The adaptor of claim 1, wherein the number of fluid emitting orifices present in said adaptor body is equal to the number of work piece chucks present on a lathe to which said adaptor will be installed.

9. The adaptor of claim 1, wherein said fluid emitting orifices occur in groups.

10. The adaptor of claim 9, wherein the number of fluid emitting orifice groups present in said adaptor body is equal to the number of work piece chucks present on a lathe to which said adaptor will be installed.

11. The adaptor of claim 1, further comprising a nozzle located in one or more of said fluid emitting orifices.

12. A chip removal adaptor for use on a lathe having a rotating work piece holder and a number of work piece chucks for releasably securing a work piece to the work piece holder, comprising:
  an adaptor body having a base portion designed for direct or indirect attachment to said work piece holder and a substantially frusto-conically shaped orifice-containing portion having at least one fluid emitting orifice;
  a primary fluid channel leading into said base portion of said adaptor body, said primary fluid channel in communication with a source of pressurized fluid when said adaptor is properly attached to said work piece holder; and a secondary fluid channel connecting each fluid emitting orifice to said primary fluid channel;

wherein said adaptor body is designed to be substantially centered among said work piece chucks when said adaptor is properly attached to said work piece holder; and wherein said at least one fluid emitting orifice exits said adaptor body at an angle that will cause fluid emitted therefrom to impinge on clamping surfaces of said work piece chucks when no work piece is present on said work piece holder.

13. The adaptor of claim 12, further comprising a locator for retaining said base portion of said adaptor body and securing said adaptor body to said work piece holder.

14. The adaptor of claim 12, wherein said fluid emitting orifices exit said orifice-containing portion of said adaptor body at a location that permits the introduction therethrough of coolant into a bore of an associated work piece while said work piece is maintained in a machining position on said lathe.

15. The adaptor of claim 12, wherein said pressurized fluid is air.

16. The adaptor of claim 12, wherein the number of fluid emitting orifices present in said adaptor body is equal to the number of work piece chucks present on a lathe to which said adaptor will be installed.

17. The adaptor of claim 12, wherein said fluid emitting orifices occur in groups.

18. The adaptor of claim 17, wherein the number of fluid emitting orifice groups present in said adaptor body is equal to the number of work piece chucks present on a lathe to which said adaptor will be installed.

* * * * *